United States Patent
Tuttle et al.

(10) Patent No.: US 8,195,115 B2
(45) Date of Patent: *Jun. 5, 2012

(54) RECEIVER ARCHITECTURES FOR DIGITAL RADIO BROADCASTS AND ASSOCIATED METHODS

(75) Inventors: G. Tyson Tuttle, Austin, TX (US); Dan B. Kasha, Seattle, WA (US); Wade R. Gillham, Austin, TX (US); Richard T. Behrens, Lafayette, CO (US)

(73) Assignee: Silicon Laboratories, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/111,623

(22) Filed: May 19, 2011

(65) Prior Publication Data

US 2011/0216855 A1 Sep. 8, 2011

Related U.S. Application Data

(63) Continuation of application No. 11/726,500, filed on Mar. 22, 2007, now Pat. No. 7,949,319.

(51) Int. Cl.
*H04B 1/18* (2006.01)
*H04B 1/26* (2006.01)

(52) U.S. Cl. ..................... 455/189.1; 455/324

(58) Field of Classification Search ............... 455/552.1, 455/553.1, 179.1, 180.1, 188.1, 189.1, 190.1, 455/191.3, 323, 324, 3.01, 3.04
See application file for complete search history.

(56) References Cited

U.S. PATENT DOCUMENTS

| | | | |
|---|---|---|---|
| 5,822,704 A | 10/1998 | Ishii | 455/553.1 |
| 6,430,227 B1 | 8/2002 | Kroeger et al. | 375/260 |
| 6,982,948 B2 | 1/2006 | Kroeger et al. | 370/208 |
| 7,486,131 B2 | 2/2009 | Murofushi et al. | 329/304 |
| 2004/0022229 A1 | 2/2004 | Vanness | 370/343 |
| 2004/0264600 A1 | 12/2004 | Kao et al. | 375/316 |
| 2005/0105657 A1 | 5/2005 | Kroeger et al. | 375/347 |
| 2006/0083380 A1* | 4/2006 | Mino et al. | 381/2 |
| 2007/0274420 A1* | 11/2007 | Billings | 375/344 |

OTHER PUBLICATIONS

Peyla, Paul J., "*The Structure and Generation of Robust Waveforms for FM In-Band On-Channel Digital Broadcastings*," pp. 1-17, iBiquity Digital Corporation (available before Feb. 2007).
Johnson, Steven A., "*The Structure and Generation of Robust Waveforms for an in Band on Channel Digital Broadcast*," pp. 1-10, iBiquity Digital Corporation (available before Feb. 2007).
Non-Final Office Action Mailed Jan. 1, 2010, U.S. Appl. No. 11/726,500, "*Receiver Architectures for Digital Radio Broadcasts and Associated Methods*," filed on Mar. 22, 2007.
Final Office Action Mailed Aug. 27, 2010, U.S. Appl. No. 11/726,500, "*Receiver Architectures for Digital Radio Broadcasts and Associated Methods*," filed on Mar. 22, 2007.

* cited by examiner

*Primary Examiner* — Nguyen Vo
(74) *Attorney, Agent, or Firm* — O'Keefe, Egan, Peterman & Enders, LLP

(57) ABSTRACT

Receiver architectures and related methods are disclosed for high definition (HD) and digital radio FM broadcast receivers. The radio receiver architectures are configured to utilize multiple analog-to-digital converters (ADCs) to handle the digital radio spectrum and can be configured to modify a target IF frequencies depending upon the mode of operation of the receiver. For example, the receiver can include an analog FM reception mode and a digital FM reception mode for which different down-conversions are used for the same analog-plus-digital audio broadcast channel. If desired, the radio broadcast receivers disclosed can be configured so that they only receive digital FM radio content, for example, if the analog FM broadcast was of no interest and/or if the broadcast was all digital.

20 Claims, 5 Drawing Sheets

RECEIVER ARCHITECTURES FOR DIGITAL RADIO BROADCASTS AND ASSOCIATED METHODS

RELATED APPLICATIONS

This application is a continuation application of U.S. patent application Ser. No. 11/726,500, filed Mar. 22, 2007, now U.S. Pat. No. 7,949,319, and entitled "RECEIVER ARCHITECTURES FOR DIGITAL RADIO BROADCASTS AND ASSOCIATED METHODS," which is hereby incorporated by reference in its entirety.

TECHNICAL FIELD OF THE INVENTION

This invention relates to radio-frequency communications. More particularly, the present invention relates to radio-frequency receivers for digital audio broadcasts including high definition (HD) digital audio broadcasts.

BACKGROUND

Radio frequency (RF) receivers are used in a wide variety of applications such as television, cellular telephones, pagers, global positioning system (GPS) receivers, cable modems, cordless phones, radios and other devices that receive radio frequency (RF) signals. RF receivers typically require frequency translation or mixing. For example, with respect to FM audio broadcasts, FM radio receivers may translate broadcast channels in the FM frequency band to an intermediate frequency, digitize the received signals, and then digitally process the digital signals to reproduce audio content for tuned channels. Within the United States, FM radios will typically translate FM audio signals, which are broadcast in 200 KHz channels in the frequency band from 88 MHz to 108 MHz, to an intermediate frequency of 10.7 MHz. FM demodulators and stereo decoders can then convert this 10.7 MHz IF signal to demodulated left and right audio signal that can be sent to stereo speakers. Although other countries will have different frequency bands and channel spacing, the reception of audio broadcast signals, such as FM audio broadcasts, is similarly accomplished using RF receivers.

Within the United States, high definition (HD) audio broadcasts are currently being provided by certain broadcasters. Protocols for HD radio in the United States were developed by iBiquity Digital Corporation. Unlike traditional analog FM broadcasts, HD radio broadcasts include digital radio broadcasts. The HD spectrums are described, for example, in the article Peyla, Paul J., "THE STRUCTURE AND GENERATION OF ROBUST WAVEFORMS FOR FM IN-BAND ON-CHANNEL DIGITAL BROADCASTING," iBiquity Digital Corporation (2004), which is hereby incorporated by reference in its entirety. As described in this article with respect to the Hybrid Waveform, HD radio digital FM broadcasts can be implemented as sideband frequencies related to a primary analog FM broadcast channel. It is noted that this article contemplates that future generations of HD radio broadcasts will use more and more of the channel and sideband frequencies for digital content (e.g., Extended Hybrid Waveform, All Digital Waveform). In addition to the article above, the transmission and reception of HD radio broadcasts are further describe in U.S. Pat. Nos. 6,982,948, 6,430,227 and U.S. Published Patent Application No. 2005/0105657, each of which is hereby incorporated by reference in its entirety.

SUMMARY OF THE INVENTION

Receiver architectures and related methods are disclosed for digital radio FM broadcast receivers including high definition (HD) digital radio broadcasts. The radio receiver architectures can be configured to utilize multiple analog-to-digital converters (ADCs) to handle the digital radio spectrum and can be configured to modify IF (intermediate frequency) target frequencies depending upon the mode of operation of the receiver. For example, the digital radio receiver architectures disclosed herein can include an analog FM reception mode and a digital FM reception mode where both analog and digital broadcasts are associated with FM channels. As described below, other features, variations and architectures can be implemented, if desired, and various related systems and methods can be utilized, as well.

In one embodiment for the digital radio FM broadcast receivers disclosed herein, different target frequencies are used for mixing the audio broadcast FM channel to one or more intermediate frequencies (IFs). In the analog FM reception mode, the desired analog FM broadcast channel within the received radio frequency (RF) signal spectrum is mixed down to an intermediate frequency (low-IF) frequency, then digitized and digitally processed to generate audio output signals. In the digital FM reception mode, the analog FM broadcast channel associated with the desired digital FM broadcast channels is directly mixed down to DC thereby leaving the desired digital FM broadcast channel sidebands located within a positive sideband frequency range offset from DC and a negative sideband frequency range offset from DC. These desired digital FM broadcast channels are then digitized and digitally processed to generate audio output signals. If desired, the digital radio broadcast receivers may be configured so that they receive only digital FM radio content, for example, if the analog FM broadcast was of no interest and/or if the broadcast was all digital. As described below, other features, variations and architectures can be implemented, if desired, and various related systems and methods can be utilized, as well.

In another embodiment, the digital radio FM broadcast receivers disclosed herein utilize multiple analog-to-digital converters (ADCs) to process the digital radio spectrum. For example, in digital FM reception mode, a first ADC can be used to process the positive sideband signals, and a second ADC can be used to process the negative sideband signals. In analog FM reception mode, only one of the ADC may be used, if desired, or both could be used if additional performance was desired. Thus, by providing multiple ADCS, these ADCs can be used in different ways for different modes of operation for the digital radio FM broadcast receivers described herein. As described below, other features, variations and architectures can be implemented, if desired, and various related systems and methods can be utilized, as well.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

Receiver architectures and related methods are disclosed herein for digital radio FM broadcast receivers including high definition (HD) radio FM broadcast receivers. As described in more detail below, the radio receiver architectures described here can include multiple operational modes, such as an analog FM reception mode and a digital FM reception mode, where analog and digital signals are associated with FM audio broadcast channels, and can include the use of multiple analog-to-digital converters (ADCs) to provide flexibility in processing the received signals.

Figure 1:
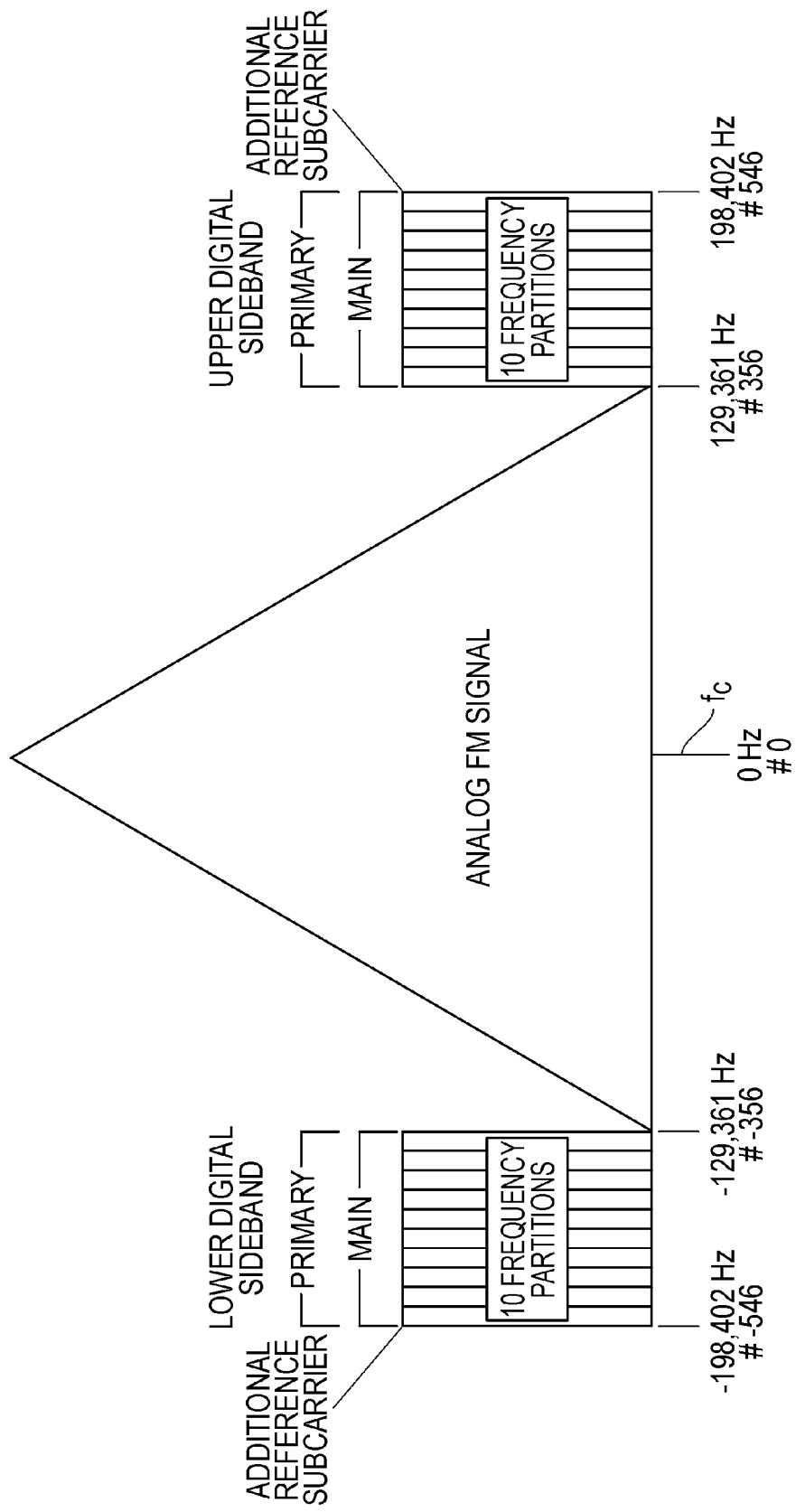
FIG. 1 (prior art) is a signal diagram for the Hybrid Waveform for HD radio broadcasts.

FIG. 1 (prior art) is a signal diagram for the Hybrid Waveform for HD (High Definition) digital audio broadcasts. As described in the iBiquity Digital Corporation article identified above, in this Hybrid Waveform, the digital signal is transmitted in primary main (PM) sidebands on either side of the analog FM signal, which is centered on the center frequency for the FM channel ($f_C$). The analog signal may be monophonic or stereo, and may include SCA channels. Each PM sideband is comprised of ten frequency partitions, which are allocated among subcarriers 356 through 545 and/or −356 through −545. Subcarriers 546 and -546, also included in the PM sidebands, are additional reference subcarriers.

Figure 2:
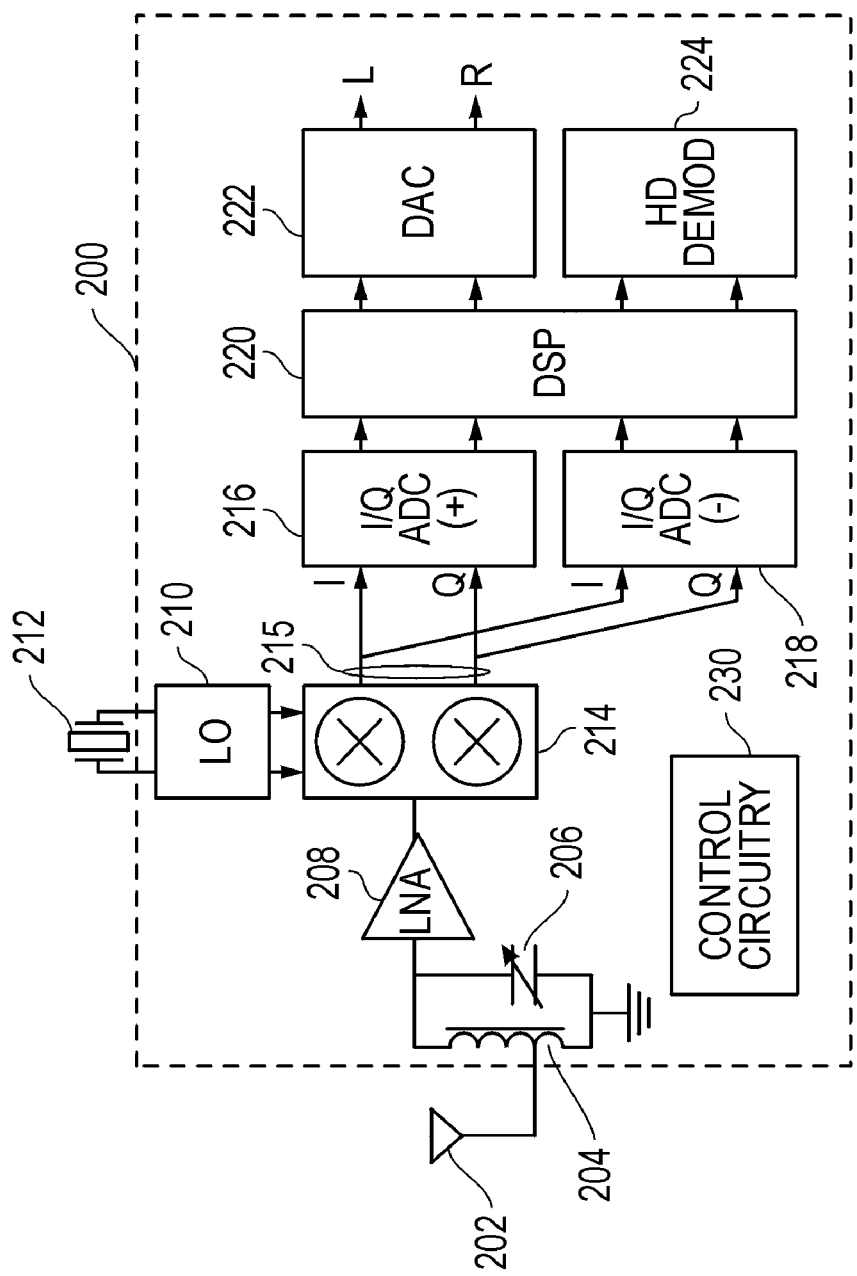
FIG. 2 is a block diagram of receiver architecture for receiving HD radio broadcasts and conventional analog FM radio broadcasts within the same integrated receiver.

FIG. 2 is a block diagram for a receiver architecture for an digital radio broadcast receiver including an integrated receiver 200. Radio frequency (RF) signals are received by an internal antenna 204 and/or an externally connected antenna 202. An on-chip variable capacitor array 206 may be used to tune the antenna circuitry, if desired. The received RF signal then passes to the low noise amplifier (LNA) 208 and then to mixer 214. Mixer 214 also receives mixing signals from the local oscillator (LO) circuitry 210 and outputs real path (I) and imaginary path (Q) analog signals (I/Q signals) 215. The LO circuitry 210 can receive a reference frequency from an external crystal oscillator 212, if desired.

The I/Q signals 215 are then provided to a first ADC 216 that digitizes the analog I/Q signals and outputs a first set of digital I/Q signals to the digital signal processor (DSP) 220. The I/Q signals 215 are also provided to a second ADC 218 that concurrently digitizes the I/Q signals and outputs a second set of digital I/Q signals to the DSP 220. The DSP 220 processes the digital signals from either or both ADCs and then outputs digital audio signals and/or digital data signals. These digital audio and data signals can be output to external circuitry, if desired. These digital audio signals are also provided to the digital-to-analog converter (DAC) 222. The DAC 222 converts the digital signals to left (L) and right (R) audio output signals. The integrated receiver 200 also includes an HD demodulator 224 that processes digital HD radio signals as part of the digital signal processing. As such, the HD demodulator 224 is depicted as coupled to the DSP 220. It is noted that the digital processing may be provided in part through the use of an on-chip integrated programmable microcontroller, including the functionality of the DSP 220 and the HD demodulator 224. It is also noted that an HD demodulator could be implemented external to the integrated receiver 200, for example, in other external integrated circuitry, if desired.

As indicated above, the digital radio receiver can be configured to have an analog FM reception mode and a digital FM reception mode where analog and digital content are associated with the same audio broadcast channel and where it is desired to receive both the analog and digital content. These modes of operation can be controlled using on-chip control circuitry 230. In particular, the control circuitry 230 can control the operation of the variable capacitance circuitry 206, the LO circuitry 210, the mixer 214, the ADCs 216 and 218, the DSP 220, the DAC 222 the HD demodulator 224, and/or any other desired on-chip or off-chip circuitry. It is noted that the control circuitry 230 can also be implemented, in part or in whole, using an on-chip integrated microcontroller, as desired. This integrated microcontroller can also be software configurable through a control interface provided for the integrated circuit 200, if desired. It is further noted that other circuitry could be included, as desired, within the integrated receiver 200 depending upon the application for the integrated receiver 200.

Looking back to FIG. 1 (prior art), it is seen that the Hybrid Waveform for the HD radio broadcasts includes analog FM signals centered on the center frequency ($f_C$) for the FM channel and includes upper and lower digital sideband signals associated with the FM channel. As described in more detail below, the integrated receiver 200 includes multiple ADCs to facilitate the handling of the digital audio channel waveforms, including the digital sidebands in the Hybrid Waveform, and these multiple ADCs can be used alone or in combination for the various modes of operation for the integrated receiver 200. It is noted that more ADCs could also be utilized, if desired. By providing a plurality of ADCs within the integrated circuit 200, wide flexibility is provided for receiving and processing digital audio waveforms (e.g., Extended Hybrid Waveform, All Digital Waveform, or other digital audio waveforms).

For one embodiment, in the analog FM reception mode, the desired analog FM broadcast channel within the received RF signal spectrum may be mixed down to a low intermediate frequency (low-IF), then digitized and digitally processed to generate audio output signals. In this analog FM reception mode, only one of the ADCs 216 and 218 would need to be utilized. The other ADC could be shut down to conserve power. In mixing down the RF signal spectrum, the mixing signals from the LO circuitry 210 are adjusted depending upon the desired channel to be tuned such that the desired channel is mixed to the selected low-IF target frequency. It is noted that as used herein, a low-IF is a frequency located within about 5 channel widths from DC (e.g., within about 1000 kHz for the US FM channel spectrum) and preferably within about 3 channel widths from DC (e.g., within about 600 kHz for the US FM channel spectrum). It is noted, and as further described below, other IF target frequencies may be utilized, if desired, other than low-IF target frequencies.

In the digital FM reception mode, the analog FM broadcast channel associated with the desired digital FM broadcast channels may be directly mixed down to DC thereby leaving the desired digital FM broadcast channel sidebands located within a positive sideband frequency range offset from DC and a negative sideband frequency range offset from DC. These desired digital FM broadcast channels can then digitized and digitally processed to generate audio output signals. In this digital FM reception mode, both ADCs 216 and 218 are used. As depicted, ADC 216 is used to digitize the digital sideband in the positive (+) frequency range with respect to the center frequency ($f_C$) of the FM audio broadcast channel, and ADC 218 is used to digitize the digital sideband in the negative (−) frequency range with respect to the center frequency ($f_C$) of the FM audio broadcast channel. In FIG. 1 (prior art), the positive (+) frequency range sideband is called the upper digital sideband, and the negative (−) frequency range sideband is called the lower digital sideband.

Thus, in operation, the mixing signals from the LO 210 are adjusted based upon the desired FM channel and based upon whether the receiver is in digital FM reception mode or analog FM reception mode. For example, to listen to the analog FM content on a particular FM digital audio channel, the LO circuitry 210 is adjusted so that the desired FM channel is mixed to a target frequency, such as a low-IF target frequency (e.g., 128 kHz). To save power, one of the ADCs 216 and 218 can used, and the other can be turned off. Alternatively, both ADCs could still be used on the analog FM channel to improve dynamic range (e.g. by 3 dB) in exchange for twice the power consumption. To next listen to the digital audio content, the FM LO circuitry 210 is adjusted such that the FM digital audio channel is re-centered to about DC. As such, the upper digital sideband is now positioned at a positive frequency range (about +129.361 kHz to +198.402 kHz) and digitized by the positive (+) I/Q ADC 216, and the lower digital sideband is now positioned at a negative frequency range (about −129.361 kHz to −198.402 kHz) and digitized by the negative (−) I/Q ADC 218. The DSP 220 and the HD demodulator 224 may the be used to process these digital signals to obtain the HD radio content. If it is desired to transition back to analog FM content, the analog audio broadcast channel is re-centered back to the low-IF target frequency.

The re-centering of the analog FM channel between low-IF target frequencies for analog FM reception mode and DC (i.e., zero-IF) for digital FM reception mode advantageously allows for the re-use of digital signal processing circuitry and ADCs. In addition, the sidebands in the digital FM reception mode are located in relatively low frequency ranges thereby helping to reduce image rejection problems that could be caused by digital carrier frequencies and large (e.g., >400 kHz) interferers.

In addition, the receiver architecture described herein provides increased flexibility for processing digital audio waveforms by providing multiple ADCs in the receiver signal path. In addition, the additional ADCs can be selectably enabled and disabled, as desired, depending upon the mode of operation desired (e.g., HD radio only, HD radio+analog radio, analog radio with improved dynamic range, etc.). It is also noted that the second or additional ADCs can be used to implement a blind image calibration algorithm in analog FM reception mode. Other varied uses for the multiple ADCs in the modes of operation for the integrated receiver 200 could also be provided, if desired.

Further, the ADCs 216 and 218 can be implemented as continuous-time delta-sigma ADCs. The self anti-aliasing properties of continuous-time delta-sigma ADCs are helpful in improving the performance of the integrated receiver 200. In such an implementation, each complex bandpass ADC effectively contains its own anti-aliasing filter to remove signal energy outside its pass-band, which will help improve dynamic range and potentially ease requirements for digital decimation filters with the DSP 220. The output signals from ADC 218 and ADC 216 will differ, even though they may be connected to the same input signal, because each ADC has a different pass-band and consequently the signal is filtered differently in each ADC. In this way, the ADCs can be combined to cover a larger bandwidth of input frequencies than each individual ADC.

The ADCs 216 and 218 may also be implemented such that each is configured to have a different noise spectrum and to cover a different frequency band. Complex bandpass continuous time delta-sigma ADCs can be implemented as desired, and may be viewed as a single complex ADC or as two real ADCs that interact. The notion of using two or more ADCs to convert different frequency bands of a signal as described herein is distinct from the notion of using two real ADC to create a complex ADC. We use the term ADC in the singular even for a complex ADC. Still further, the outputs of the two ADCs can be combined in the digital domain to reconstruct, if desired, the digital signal that would have resulted from a single ADC covering the whole bandwidth (e.g., these two digital signals can be added together). Preferably, the two ADC circuit blocks will have closely matched gain and phase delay for this combination of signals to provide good performance, and the gain and phase differences may need to be calibrated. Further, in digital reception mode, the upper and lower sidebands may be independently demodulated and then recombined before decoding.

With respect to the various modes of operation for the integrated receiver 200, it is noted that the receiver can be configured to switch among its modes of operation based upon one or more desired criterion. For example, in one application, where the digital audio content and the analog audio content are similar, it is desirable to select the mode in which the better signal quality is being achieved. To make this determination, the signal-to-noise (SNR) ratio of the analog signal could be utilized to determine the quality of the analog signal being received. In addition, the digital bit error rate of the digital audio signal could be used to determine the quality of the digital signal being received. Decisions concerning modes of operation may then be made using this SNR and bit rate criterion and/or other criterion, as desired.

Using different IF target frequencies in the analog reception mode and the digital reception mode, as described above, facilitates the ability to switch quickly between digital and analog reception modes. This fast dynamic switching between modes, for example, helps to support a feature where the receiver can fade back to analog whenever the digital reception is failing It is noted that the analog signal in the Hybrid HD transmission mode is typically delayed deliberately at the transmitter to allow the receiver to process the digital, decide if it is valid, and still have time to fade back to analog if the digital data is invalid.

For fading from analog back to digital, both ADCs could be used during analog reception mode in order to receive the analog bandwidth and to check the digital bandwidth. In particular, by using both ADCs, the entire analog and digital bandwidth can be covered. While one ADC is configured for the analog signals, the other ADC can be configured for the digital signals. As such, the digital signal can be received, and its bit error rate can be checked, while in analog reception mode. Depending upon this bit rate error check, a decision can be made to fade to digital mode, and make the audio fade back, all the while simultaneously continuing to receive and play back the analog FM signal until the fade to digital is completed. Supporting this simultaneous reception mode can be implemented using an IF target frequency compatible with both digital and analog reception. In particular, the analog reception may be degraded if the IF is chosen within the analog signal bandwidth (including DC), and the digital reception may be degraded if the IF is chosen within a digital sideband. Some alternative IF selections are set forth below. In addition, an alternative is to place the IF at a higher frequency, beyond the digital sidebands. Thus, an IF to support simultaneous analog and digital reception may not be an optimal choice of an IF for digital reception. Consequently, it may still be advantageous to change the IF when transitioning back and forth between analog and digital reception modes. It is noted that the different modes of operation and transitions between modes of operation may utilize different combinations of choices for IFs and for ADC frequency bands depending upon the operational results desired. In addition, it is noted that the use of multiple ADCs, the choice of how many ADCs to use, and the choice of frequency bands configured for each ADC are features that can be utilized without or without the use of different IF target frequencies for different modes of operation.

It is further noted that the IF target frequencies for the different modes of operation can be selected as desired. As described above, one selection may be to have the FM channel mixed to a low-IF target frequency in analog reception mode and to zero-IF (DC) in digital reception mode. However, these target frequencies could be selected as different target frequencies, if desired, and these target frequencies could be selected to be the same target frequencies, if desired. In addition, a zero-IF (DC) target frequency need not be used. In other words, the target frequencies to which the RF signal is down-converted prior to being digitized may be selected as desired and may be the same for the different modes of operation or may be different for the different modes of operation. The use of the ADCs (e.g., ADCs 216 and 218) may be controlled based upon the modes of operation and the target frequencies selected. In addition, the multiple ADCs (e.g., ADCs 216 and 218) within the integrated receiver 200 can be used to facilitate processing of the signals based upon considerations with respect to the waveform being utilized for the digital audio broadcasts (e.g., Hybrid Waveform, Extended Hybrid Waveform, All Digital Waveform, etc.).

One target frequency implementation that could be used is to mix the FM channel such that the one of the reference subcarriers in the HD radio waveform falls at zero-IF (DC). It is possible that the coding for control channels within the reference subcarrier would not be needed, and this subcarrier could be notched out with a filter around DC. This technique could allow the integrated receiver 200 to receive all of the frequency partitions simultaneously for the All Digital Waveform, without resorting to a higher IF target frequency outside the channel. With respect to the Extended Hybrid Waveform, another frequency that could be used is a frequency that falls between an OFDM (orthogonal frequency division multiplex) channel and the analog signal. The down conversion could mix this frequency to zero-IF (DC) and allow both analog and digital reception modes to operate without changing the target frequencies when changing between the digital and analog reception modes. Still further, the RDS (radio data signal) carrier frequency could be down-converted to zero-IF (DC) assuming the RDS information becomes less important when one is receiving the same or similar information through the HD digital transmissions. In short, the down conversion can be configured as desired to place zero-IF (DC) at a selected frequency within the digital audio waveform, and different down conversions can be configured for different modes of operation, as desired. Typically, the frequencies located at zero-IF (DC) after the down conversion will be filtered out using a notch filter or other filter. Content or information on these frequencies, therefore, will not typically available for further processing by the integrated receiver 200.

Figure 3A:
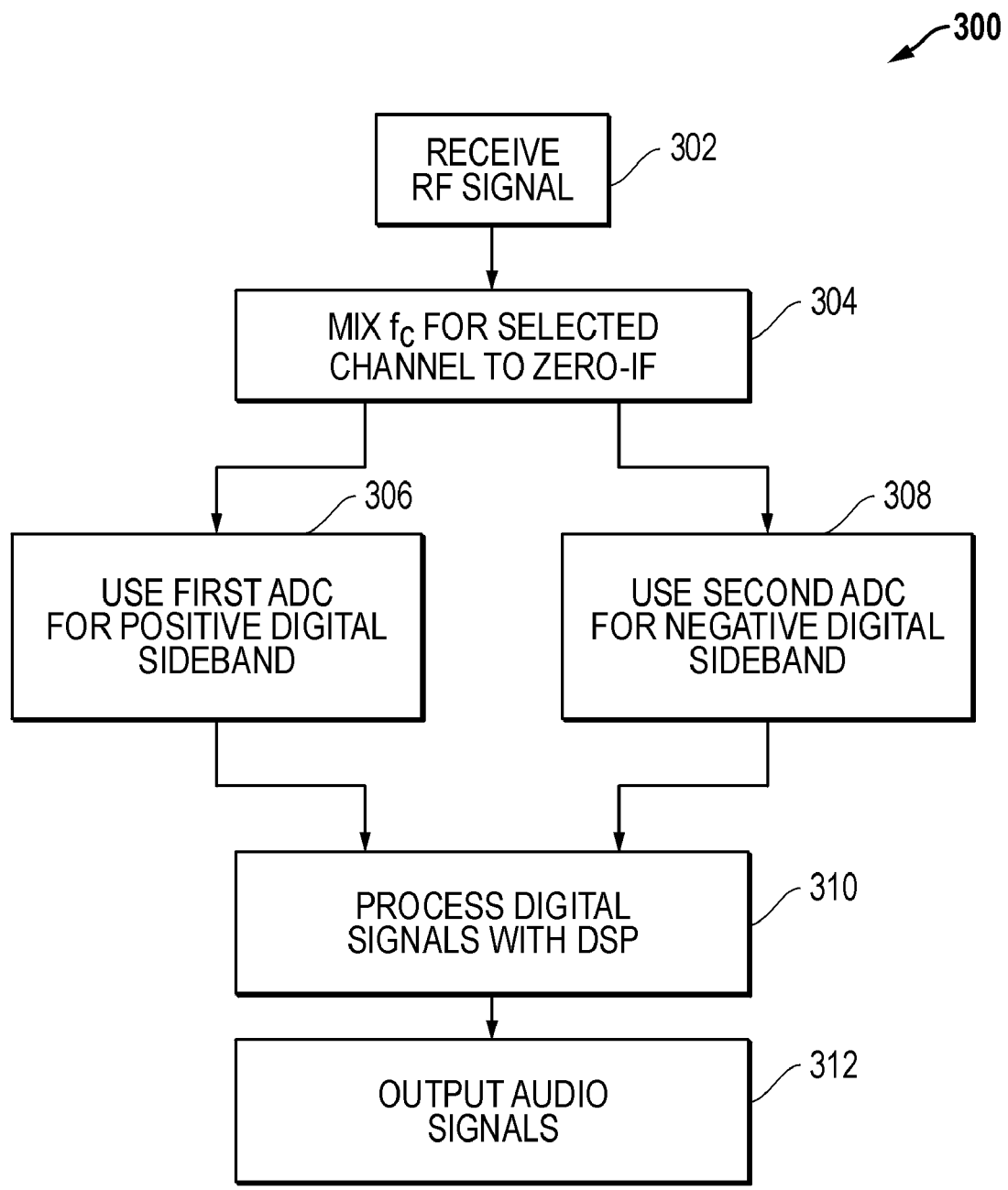
FIG. 3A is a process diagram for use of multiple analog-to-digital converters (ADCs) for a digital reception mode where the channel center frequency ($f_C$) is mixed down to a zero intermediate frequency (zero-IF) or DC.
Figure 3B:
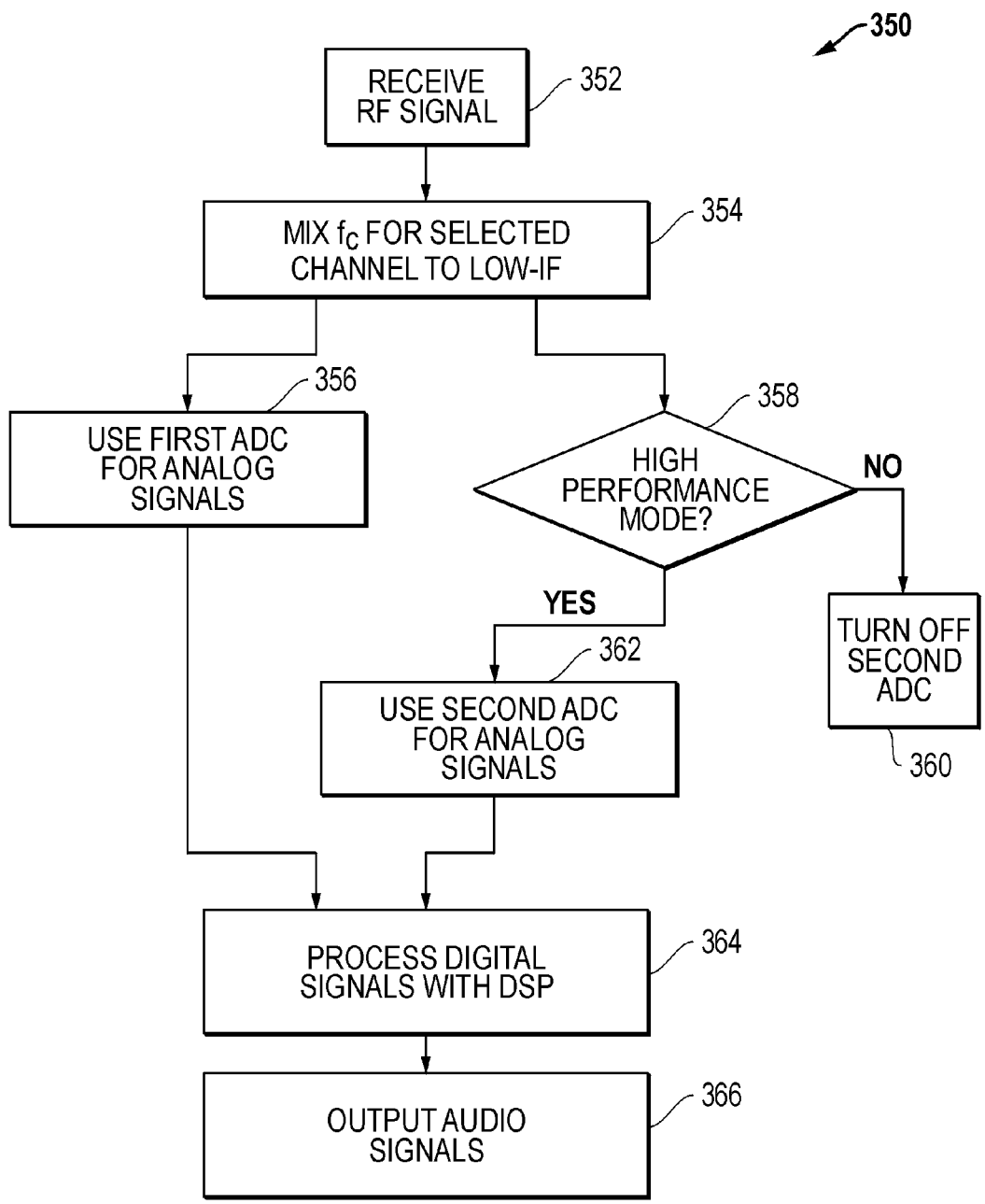
FIG. 3B is a process diagram for use of multiple analog-to-digital converters (ADCs) for an analog reception mode where the channel center frequency ($f_C$) is mixed down to a low intermediate frequency (low-IF).
Figure 4:
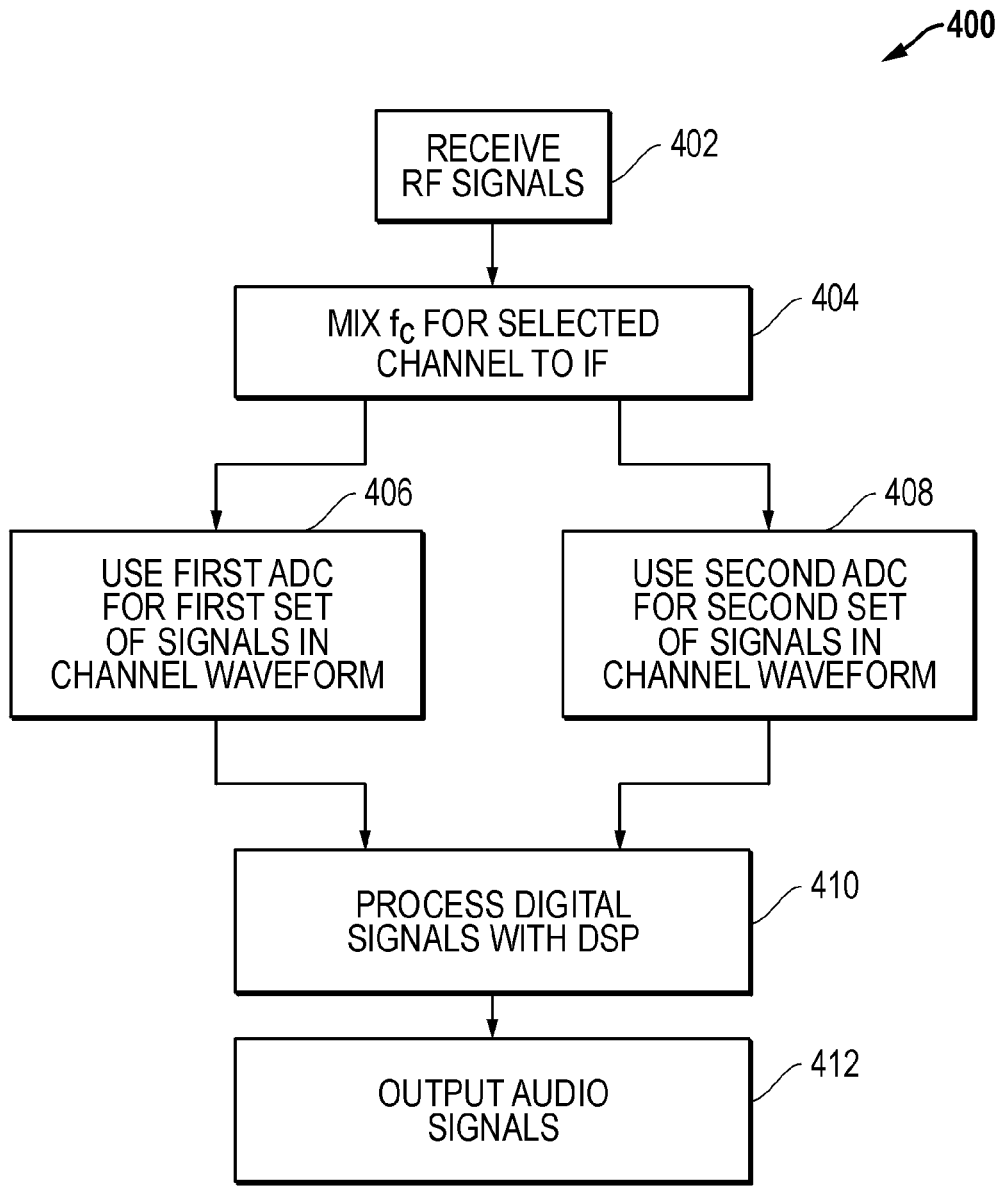
FIG. 4 is a process diagram for use of multiple analog-to-digital converters (ADCs) for an channel waveform having digital content where the center frequency ($f_C$) is mixed down to a selected intermediate frequency (IF).

FIGS. 3A, 3B and 4 are now discussed and provide example embodiments for process flows that utilize multiple ADCs to process the digital audio waveform. It is noted that these are only examples and, as described herein, other embodiments and techniques could be implemented as desired to take advantage of having the multiple ADCs within the integrated receiver 200. In addition, it is again noted that more than two ADCs could be utilized, as desired.

FIG. 3A is a process diagram 200 for use of multiple analog-to-digital converters (ADCs) for a digital reception mode where the channel center frequency ($f_C$) is mixed down to a zero intermediate frequency (zero-IF) or DC. In block 302, RF signals are received by the integrated receiver. In block 304, the center frequency ($f_C$) for the selected audio channel is mixed down to zero-IF (DC). In block 306, the first ADC is used for digitizing the positive digital sideband signals in the channel waveform, for example, as depicted in FIG. 1 (prior art). In block 308, the second ADC is used for digitizing the negative digital sideband signals in the channel waveform. In block 310, the digital signals from the first and second ADCs are processed with the DSP. Finally, in block 312, audio signals are output.

FIG. 3B is a process diagram 350 for use of multiple analog-to-digital converters (ADCs) for an analog reception mode where the channel center frequency ($f_C$) is mixed down to a low intermediate frequency (low-IF). In block 352, RF signals are received by the integrated receiver. In block 354, the center frequency ($f_C$) for the selected audio channel is mixed down to low-IF. In block 356, the first ADC is used for digitizing the analog signals in the channel waveform, for example, as depicted in FIG. 1 (prior art). In block 358, a decision is made whether a high performance mode has been selected. If "no," then the second ADC is turned off to conserve power in block 360. If "yes," then the second ADC is used to also digitize the analog signals in the channel waveform in block 362. In block 364, the digital signals from the first ADC, as well as from the second ADC is utilized in block 362, are processed with the DSP. Finally, in block 312, audio signals are output.

FIG. 4 is a process diagram 400 for use of multiple analog-to-digital converters (ADCs) for an channel waveform having digital content where the center frequency ($f_C$) is mixed down to a selected intermediate frequency (IF). In block 402, RF signals are received by the integrated receiver. In block 404, the center frequency ($f_C$) for the selected audio channel is mixed down to a desired intermediate frequency (IF). As discussed herein, this IF can be any desired IF depending upon the operational parameters desired for the integrated receiver 200. For example, this IF could be a low-IF or zero-IF, if desired. In addition, different IFs could be used depending upon selected modes of operation for the integrated receiver, depending upon the channel to be tuned (e.g., where different digital audio waveforms are utilized by different digital audio broadcast channels), and/or based upon other desired criterion. In block 406, the first ADC is used for digitizing a first set of signals in the channel waveform. In block 408, the second ADC is used for digitizing a second set of signals in the channel waveform. In block 410, the digital signals from the first and second ADCs are processed with the DSP. Finally, in block 412, audio signals are output.

In summary, by providing a plurality of ADCs within the integrated circuit 200, wide flexibility is provided for receiving and processing digital audio waveforms (e.g., Extended Hybrid Waveform, All Digital Waveform, or other digital audio waveforms). In addition, by providing the ability to use different IFs for different modes of operation and/or for different audio broadcast channels, a wide flexibility is also provided for receiving and processing digital audio waveforms.

As indicated above, FIG. 1 (prior art) represents the Hybrid Waveform currently used for HD radio. However, as also indicated above, there are other HD radio spectrums contemplated. The Extended Hybrid Waveform, for example, adds additional digital OFDM subcarriers to the primary main sidebands present in the Hybrid Waveform. The receiver architecture of FIG. 2 and reception techniques described herein are also effective for this Extended Hybrid Waveform. In addition, the All Digital Waveform is constructed by disabling the analog signal, fully expanding the bandwidth of the primary digital sidebands, and adding lower-power secondary sidebands in the spectrum vacated by the analog signal. The receiver architecture of FIG. 2 and reception techniques described herein are also effective for this All Digital Waveform. For example, in the All Digital Waveform, the center frequency of the FM channel can be mixed to an intermediate frequency within a primary frequency partition when tuning to the secondary main frequency partitions that touch the middle of the channel. Otherwise the digital FM audio content can still be extracted by mixing the center frequency of the FM channel to DC and then using the two ADCs. Alternatively, the center frequency of the FM channel can be mixed to an intermediate frequency outside (above or below) the spectrum occupied by the All Digital Waveform.

It is further noted that the digital radio functionality provided multiple ADCs (e.g., ADCs 216 and 218) in the receive path could be implemented with respect to other receiver architectures including FM receiver architectures, AM/FM receiver architectures, and FM receiver plus FM transmitter architectures such as those disclosed in previous patent applications assigned to the same assignee as this current application—Silicon Laboratories Inc. For example, integrated FM receivers, which can also include integrated AM reception, are described in U.S. patent application Ser. No. 10/881,926, filed Jun. 30, 2004, and entitled "INTEGRATED LOW-IF TERRESTRIAL AUDIO BROADCAST RECEIVER AND ASSOCIATED METHOD," which is hereby incorporated by reference in its entirety. Integrated FM receivers and FM transmitters are described in U.S. patent application Ser. No. 11/396,097, filed Mar. 31, 2006, and entitled "TRANSCEIVER HAVING MULTIPLE SIGNAL PROCESSING MODES OF OPERATION," which is hereby incorporated by reference in its entirety.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. An integrated digital audio receiver operable in a analog reception mode of operation and a digital reception mode of operation, comprising:

mixing circuitry configured to mix radio frequency (RF) input signals with mixing signals to down convert an audio broadcast channel to a first intermediate frequency (IF) target frequency for an analog reception mode of operation and to a second IF target frequency for a digital reception mode of operation, the first and second IF target frequencies being different, and the mixing circuitry being configured to output analog real (I) and imaginary (Q) signals;

local oscillator (LO) circuitry configured to provide the mixing signals to the mixing circuitry, the mixing signals being dependent upon an audio broadcast channel to be tuned and being dependent upon the mode of operation;

analog to digital conversion (ADC) circuitry coupled to receive the analog I and Q signals and to output digital I and Q signals;

digital signal processing (DSP) circuitry configured to receive and digitally process the digital I and Q signals, the DSP being configured to output digital signals related to analog content within the audio broadcast channel for the analog reception mode of operation and to output digital signals related to digital content within the audio broadcast channel for the digital reception mode of operation; and control circuitry coupled to the LO circuitry and the DSP circuitry, the control circuitry being configured to select the analog reception mode of operation or the digital reception mode of operation for the integrated digital audio receiver.

2. The integrated digital audio receiver of claim 1, wherein the audio broadcast channel to be tuned comprises analog audio content centered on a center frequency for the audio broadcast channel and digital audio content located in one or more sideband frequency ranges offset from the center frequency.

3. The integrated digital audio receiver of claim 1, wherein the first IF target frequency for the analog reception mode of operation is a low-IF target frequency and the second IF target frequency for the digital reception mode of operation is a zero-IF target frequency.

4. The integrated digital audio receiver of claim 1, wherein the first IF target frequency for the analog reception mode of operation is a first low-IF target frequency and the second IF target frequency for the digital reception mode of operation is a second low-IF target frequency.

5. The integrated digital audio receiver of claim 1, wherein the ADC circuitry comprises first ADC circuitry configured to output first digital I and Q signals and second ADC circuitry configured to output second digital I and Q signals.

6. The integrated digital audio receiver of claim 5, wherein the DSP circuitry is configured to digitally process both the first digital I and Q signals and the second digital I and Q signals.

7. The integrated digital audio receiver of claim 6, wherein the first ADC circuitry is configured to digitize a first portion of the audio broadcast channel and the second ADC configured is configured to digitize a second portion of the audio broadcast channel, the first and second portions being different.

8. The integrated digital audio receiver of claim 6, wherein the first ADC circuitry is configured to digitize a portion of the audio broadcast channel and the second ADC configured is configured to digitize the same portion of the audio broadcast channel.

9. The integrated digital audio receiver of claim 1, further comprising a digital content demodulator configured to demodulate the digital signals related to the digital content for the digital reception mode of operation.

10. The integrated digital audio receiver of claim 1, further comprising digital-to-analog converter circuitry configured to output analog audio signals related to the digital signals from the DSP circuitry.

11. A method for operating an integrated digital audio receiver, comprising:

selecting a mode of operation from a plurality of modes of operation including an analog reception mode of operation and a digital reception mode of operation;

generating mixing signals, the mixing signals being dependent upon an audio broadcast channel to be tuned and being dependent upon the selected mode of operation;

operating mixing circuitry to generate analog real (I) and imaginary (Q) signals, the mixing circuitry being configured to mix radio frequency (RF) input signals with the mixing signals to down convert the audio broadcast channel to be tuned to a first intermediate frequency (IF) target frequency for the analog reception mode of operation and to a second IF target frequency for the digital reception mode of operation, the first and second IF target frequencies being different;

digitizing the analog I and Q signals to output digital I and Q signals; and digitally processing the digital I and Q signals to output digital signals, the digital signals being related to analog content within the audio broadcast channel for the analog reception mode of operation and related to digital content within the audio broadcast channel for the digital reception mode of operation.

12. The method of claim 11, wherein the audio broadcast channel to be tuned comprises analog audio content centered on a center frequency for the audio broadcast channel and digital audio content located in one or more sideband frequency ranges offset from the center frequency.

13. The method of claim 11, wherein the first IF target frequency for the analog reception mode of operation is a low-IF target frequency and the second IF target frequency for the digital reception mode of operation is a zero-IF target frequency.

14. The method of claim 11, wherein the first IF target frequency for the analog reception mode of operation is a first low-IF target frequency and the second IF target frequency for the digital reception mode of operation is a second low-IF target frequency.

15. The method of claim 11, wherein the digitizing step comprises digitizing the analog I and Q signals to output first digital I and Q signals and also digitizing the analog I and Q signal to output second digital I and Q signals.

16. The method of claim 15, wherein the digitally processing step comprises digitally processing both the first digital I and Q signals and the second digital I and Q signals.

17. The method of claim 16, wherein the digitizing step comprises digitizing a first portion of the audio broadcast channel to output the first digital I and Q signals and digitizing a second portion of the audio broadcast channel to output the second digital I and Q signals, the first and second portions being different.

18. The method of claim 16, wherein the digitizing step comprises digitizing a portion of the audio broadcast channel to output the first digital I and Q signals and digitizing the same portion of the audio broadcast channel to output the second digital I and Q signals.

19. The method of claim 11, further comprising utilizing a digital content demodulator to demodulate the digital signals related to the digital content for the digital reception mode of operation.

20. The method of claim 11, further comprising utilizing digital-to-analog converter circuitry to output analog audio signals related to the digital signals from the DSP circuitry.

\* \* \* \* \*